(12) United States Patent
Clark et al.

(10) Patent No.: US 6,835,402 B1
(45) Date of Patent: Dec. 28, 2004

(54) CARBONATED FORTIFIED MILK-BASED BEVERAGE AND METHOD FOR SUPPRESSING BACTERIAL FORMATION IN THE BEVERAGE

(75) Inventors: George H. Clark, Woburn, MA (US); Mary Ann Clark, Woburn, MA (US)

(73) Assignee: Mac Farms Inc., Burlington, MA (US)

( * ) Notice: Subject to any disclaimer, the term of this patent is extended or adjusted under 35 U.S.C. 154(b) by 338 days.

(21) Appl. No.: 10/004,149

(22) Filed: Oct. 31, 2001

Related U.S. Application Data

(63) Continuation-in-part of application No. 09/473,252, filed on Dec. 27, 1999, now Pat. No. 6,403,129.

(51) Int. Cl.$^7$ .......................... A23C 9/00; A23L 1/304; A23L 2/00; A23L 2/40
(52) U.S. Cl. .......................... 426/72; 426/73; 426/74; 426/477; 426/580; 426/588; 426/590
(58) Field of Search .......................... 426/72, 73, 74, 426/590, 580, 477, 588

(56) References Cited

U.S. PATENT DOCUMENTS

| | | |
|---|---|---|
| 4,212,893 A | 7/1980 | Takahata |
| 4,264,638 A | 4/1981 | Sirett et al. |
| 4,446,164 A | 5/1984 | Brog |
| 4,460,616 A | 7/1984 | Rialland et al. |
| 4,737,375 A | 4/1988 | Nakel et al. |
| 4,738,856 A | 4/1988 | Clark |
| 4,738,865 A | 4/1988 | Morris |
| 4,804,552 A | 2/1989 | Ahmed et al. |
| 4,842,884 A | 6/1989 | Bookwalter et al. |
| 4,919,960 A | 4/1990 | Ahmed et al. |
| 4,980,182 A | 12/1990 | Kwon et al. |
| 5,200,226 A | 4/1993 | Sanchez Rodriguez |
| 5,202,145 A | 4/1993 | Wisler et al. |
| 5,366,751 A | 11/1994 | Pordy |
| 5,413,803 A | 5/1995 | Chung |
| 5,436,020 A | 7/1995 | Kuwata et al. |
| 5,607,714 A | 3/1997 | Connolly |
| 5,624,700 A | 4/1997 | Ogden |
| 5,648,112 A | 7/1997 | Yang et al. |
| 5,665,415 A | 9/1997 | Kligerman |
| 5,817,351 A | 10/1998 | DeWille et al. |
| 5,834,045 A | 11/1998 | Keating |

*Primary Examiner*—Keith Hendricks
(74) *Attorney, Agent, or Firm*—Lorusso Loud & Kelly LLP

(57) ABSTRACT

Dairy or non-dairy based fortified carbonated beverage solutions that supply essential nutrients in the human diet. The solution contains per 354 ml, calcium, magnesium and potassium ions in the form of salts and optionally vitamins A, D, C and folic acid in specified amounts to provide dietary supplementation. Sweeteners, stabilizers, flavors and carbonation can also be added to enhance flavor, taste, mouth-feel, ingredient solubilization and product appearance. A method of making the beverages is also described. A method of using carbonation to reduce bacterial counts from milk-based beverages with or without pasteurization is also disclosed.

22 Claims, No Drawings

CARBONATED FORTIFIED MILK-BASED BEVERAGE AND METHOD FOR SUPPRESSING BACTERIAL FORMATION IN THE BEVERAGE

CROSS-REFERENCE TO RELATED APPLICATIONS

This is a continuation-in-part of U.S. Ser. No. 09/473,252, filed Dec. 27, 1999, now U.S. Pat. No. 6,403,129, issued Jun. 11, 2002, the contents of which are incorporated herein by reference.

FIELD OF THE INVENTION

This invention relates to fortified, carbonated milk-based or non-dairy based beverages for the supplementation of essential nutrients in the human diet. This invention further relates to a method for producing carbonated milk-based or non-dairy based beverages that suppresses the formation of bacterial cultures, and thereby extends product shelf life. The beverages are designed for consumption by individuals of all ages to provide supplemental amounts of essential vitamins, amino acids, minerals and trace nutrients in the everyday diet.

BACKGROUND OF THE INVENTION

It is now well known that good nutrition is essential to the process of bone physiology. Poor dietary habits will prevent normal bone development in childhood and early adulthood and can contribute to the softening of bones and teeth as well as the acceleration of bone loss with advancing age. Milk has long been recognized as an excellent nutritional source of essential minerals such as calcium and magnesium, high quality protein and vitamins such as D, A, $B_2$, $B_1$, $B_6$ and $B_{12}$.

Proper levels of these elements are essential in the diets of children and adolescents for the development and maintenance of healthy teeth and bones and to enhance growth; in adults to improve the tone and elasticity of muscles and ligaments. Such elements also assist in and promote healthy pregnancies, enhance appetite, and in the elderly, help to prevent osteoporosis, colon cancer and heart disease.

A major nutritional problem exists in North America in that the annual consumption of milk per capita is fourth to beer, soft drinks and bottled water. Consumers reject milk for taste, fat content and in susceptible individuals, lactose intolerance. Recommended daily intake levels of vitamins, e.g., A, D, and the B group, as well as minerals, e.g., calcium, magnesium and potassium, cannot be supplemented by other commercial, non-dairy beverages due to unavailability. We know of no prior art that discloses any flavored, fortified, carbonated, milk-based or non-dairy beverages that provide enhanced supplementation of levels of essential vitamins, minerals and amino acids comparable to those available in fortified milk.

When compared to whole milk and carbonated soft drink beverages, the following results are obtained.

| Per 354 ml. | MILK | COCA COLA | INVENTION |
| --- | --- | --- | --- |
| Calories (kilocalories) | 232 | 162 | 130 |
| Carbohydrates (g) | 16 | 40 | 6 |
| Fat (g) | 12 | 0 | 0 |
| Protein (g) | 12 | 0 | 14 |
| Cholesterol (mg) | 49 | 0 | 4 |
| Vitamin A (IU) | 1000 | 0 | 1000 |
| Vitamin D (IU) | 100 | 0 | 100 |
| Vitamin C (mg) | 0.09 | 0 | 20 |
| B1 (Thiamine) (mg) | 0.17 | 0 | 0.15 |
| B2 (Riboflavin) (mg) | 0.17 | 0 | 0.15 |
| B6 (Pyrodoxine) (mg) | 0.87 | 0 | 0.11 |
| B12 (Cobolamin) (mg) | 1.34 | 0 | 1.21 |
| Folic Acid (IU) | 0 | 0 | 0.05 |
| Sodium (mg) | 122 | 14 | 126 |
| Calcium (mg) | 288 | 11 | 1000 |
| Potassium (mg) | 351 | 7.0 | 638 |
| Phosphorus (mg) | 227 | 750 | 290 |
| Magnesium (mg) | 24 | 4 | 132 |
| Iron (mg) | 0.0 | 0.18 | 0.10 |
| Copper (mg) | 0.0 | 0.10 | 0.0 |
| Carbonation (vols) | 0 | 4.0 | 3.0 |

The chart clearly illustrates how our novel beverage provides, at a minimum, the same nutritional benefit as milk with respect to vitamins, minerals and other beneficial substances naturally present in, or added as fortifications to milk. Moreover, the levels of some nutritive substances, e.g., calcium, in our beverage far exceeds the levels found in milk. Unless expressly stated otherwise, as used herein, all liquid components are measured in liters or fractions thereof and all solid components are measured in grams or fractions thereof.

U.S. Pat. No. 4,738,856 to Clark et al. discloses calcium, magnesium and potassium aspartate compositions as antihypertensive nutrition agents. Clark et al., provides that non-dairy nutritional beverages facilitate and control the transport of calcium ions into the human body while lowering blood pressure and lowering the probability or tendency of incurring colon cancer. Clark et al further discloses that beverages may provide nutritional supplementation of magnesium and/or potassium to the human diet, help reduce premenstrual tension in women, and increase cardiac tolerance in conditions of anoxia.

Clark et al. does not disclose a milk-based nutritional beverage which will provide not only large amounts of calcium, magnesium and/or potassium to the human diet, but also supplementation of essential vitamin A, vitamin D, B complex vitamins, vitamin C, vitamin K, phosphorus, iron and strontium. Clark et al., fails to disclose carbonation of a beverage to enhance the acceptance of the taste of B complex vitamins, minerals and iron in beverage preparations as well as enhance the mouth-feel of milk products to increase consumer appeal enjoyed by carbonated beverages.

U.S. Pat. No. 5,624,700 to Lyon et al. discloses a process to add carbon dioxide under low shear conditions to an already formed food to produce a semi-solid or solid carbonated food. Lyon et al. does not disclose the carbonation of a dry powder preparation of vitamins and minerals to produce an enhanced liquid dairy product for the supplementation of high levels of essential vitamins and minerals in human nutrition.

What is needed and what we have invented is an all natural, flavored, fortified, carbonated milk-based beverage that provides high dietary levels of essential vitamins, minerals and amino acids, and facilitates their absorption, which aids in the building of healthy bones and teeth and reduces the probability of developing osteoporosis. The inventive beverage also aids in the prevention of rickets in young people and the development of premenstrual tension (PMS)

in women. Folic acid of the B-complex vitamins is supplemented by this invention to counter its deficiency in the typical human diet, which may cause megaloblastosis, weight loss, anemia, cardiac enlargement, congestive heart failure, and in pregnant women, development of a fetus with spina bifida. The beverage supplies a rapidly and highly absorbable source of calcium, magnesium and potassium to the human body without gastric upset and stomach bloating, and thus provides an ideal composition for consumption by humans who are "At Risk" of developing bone diseases such as osteoporosis or osteomalacia.

Another persistent problem with respect to milk-based beverages is the formation of bacteria such as coliform, an enteric variety. Pasteurization has been, until now, the standard method used to eliminate, or at least minimize the development of bacterial colonies so as to extend the useable shelf life of milk or milk-based products. Pasteurization, in its simplest form, involves the application of heat to a substance for a specified time to destroy potentially harmful microorganisms. Variations on the standard pasteurization method have been developed to further extend the shelf life of products such as milk. One such variation is known as HTST (high temperature short time) pasteurization that utilizes temperatures of from about 180° F. to about 195° F. and time periods from about 2 seconds to about 30 seconds. Exposure time is inversely proportional to the temperature used.

A second variation is VAT pasteurization that utilizes temperatures up to about 175° F. for a time period up to about 40 minutes. A yet further variation, UHT (ultra-high temperature) pasteurization, utilizes temperatures in excess of 225° F. for about 2 to about 5 seconds. UHT pasteurization is often used to extend the shelf life of chocolate flavored milk drinks from 14 days under refrigeration with standard heat pasteurization to up to 90 days under refrigeration, and is the method typically used when chocolate milk drinks are to be kept refrigerated on store shelves for over 21 days. Whether standard or UHT pasteurization is used, stabilizers and preservatives have to be added to provide a stable product. If vitamins and minerals are added to flavored milk drinks that are to be pasteurized, gel binders are also added to stabilize the flavors, colors and nutritive additions. Gel binders present additional problems. It is well known that various gel binders have a significant negative laxative effect on susceptible individuals, e.g., children and the elderly. A yet further reason why certain individuals forego drinking even flavored milks.

Problems with off flavors and poor mouth feel persist when UHT pasteurization is used, even with the use of stabilizers and preservatives. It is known that exposing milk or milk-based products to high heat degrades certain components such as Riboflavin and Vitamin A, destroys Vitamin C, and breaks down lactose, a disaccharide sugar into its monosaccharide components. The latter effect generates off flavors. What is needed is an alternative to traditional methods of Pasteurization that extends the useful shelf life of milk-based products without causing any degradation in the product, and without needing binders, stabilizers or preservatives.

We have discovered that by exposing milk-based beverages to $CO_2$ pre-pasteurization, the formation of bacteria colonies can be suppressed, and the need for gel binders or stabilizers can be eliminated. In fact, depending on the amounts of $CO_2$ added, the need for traditional pasteurization can also be eliminated without any appreciable negative impact on the suppression of bacteria.

SUMMARY OF THE INVENTION

The beverage disclosed herein serves as a means of enhancing the attractiveness of milk based beverages in the marketplace as well as providing a delicious source of essential nutritional elements in the daily diet needed to reduce the incidence of cardiovascular disease and high blood pressure, promote the formation of healthy bones and teeth, reduce the incidence of osteoporosis and increase physical vigor, strength and endurance. The beverage also supplies more rapidly absorbed and higher levels of calcium, magnesium and potassium without gastric upset and stomach bloating. This invention further provides a pleasant vehicle for the consumption of the recommended daily requirements of essential nutrients by youth who are "AT RISK" of developing rickets, osteomalacia and other bone diseases.

The beverage described herein has carbonation to enhance taste, improve body and mouth-feel and aid in the stabilization of milk protein such as Lactalbumin and Casein. In one embodiment, the activity of milk lactose is neutralized by the addition of the enzyme lactase to reduce the possibility of allergic response such as lactose intolerance in susceptible individuals. Optionally, pure crystalline fruit fructose or a non-nutritive sweetener, or combinations thereof, such as sucralose or sucralose and asulfame K, can be added to enhance taste and flavor.

Flavors such as chocolate fudge, chocolate, vanilla, mocha, almond, coconut, latte, butterscotch, coffee and fruit flavors such as peach, orange, raspberry, strawberry, saskatoon berry, blueberry, plains berry, prairie berry and apple as well as mixtures thereof can be added to enhance taste and acceptability.

Also disclosed is a method of making the beverage that employs, in one embodiment, the addition of $CO_2$ pre-Pasteurization to eliminate or effectively reduce the formation of bacterial colonies in the beverage.

DESCRIPTION OF THE ILLUSTRATIVE EMBODIMENT

The beverage composition in its broadest aspect comprises nonfat dry milk or a non-dairy milk substitute containing sweet dairy whey, dried corn syrup, sodium caseinate and partially hydrogenated soybean oil. Alternatively the composition can be comprised of nonfat and/or skim milk and can be combined with a mixture of nonfat dry milk and/or the milk substitute. More particularly, the beverage composition comprises a beverage solution containing in each 354 ml: from about 1 g to about 1000 g of nonfat dry milk and/or from about 1 ml to about 350 ml of skim milk and/or from about 1 g to about 35 g of a nonfat milk substitute containing sweet dairy whey, dried corn syrup, sodium caseinate, partially hydrogenated soybean oil and/or mixtures thereof.

The beverage compositions also broadly comprise purified water per 354 ml of beverage solution of from about 10 ml to about 344 ml of solution. The beverage compositions further comprise a beverage solution containing per 354 ml: from about 1 mg to about 7600 mg of calcium picolinate, and/or from about 1 mg to about 7600 mg of calcium aspartate, and/or from about 1 mg to about 9,000 mg of calcium gluconate, and/or from about 1 mg to about 9,000 mg of calcium ascorbate, and/or from about 1 mg to about 9,000 mg of calcium lactate and/or mixtures thereof.

The calcium picolinate, calcium aspartate, calcium gluconate, calcium ascorbate and/or calcium lactate in these quantities provide a more easily assimilatable source of from about 0.01 meq to about 119 meq of calcium ions. Preferably, from about 0.01 meq to about 71 meq of calcium ions (or from about 2.1 mg to about 1400 mg of calcium ions) is provided to the human body with each 354 ml of beverage solution.

The calcium ions are bivalent cations, which combine with the picolinate, aspartate, gluconate, ascorbate and lactate ligands through coordination. The coordinating picolinate, aspartate, gluconate, ascorbate or lactate ligands are attached to the bivalent cations (electron acceptors) by means of a lone pair of electrons.

After ingestion, the bivalent cations (calcium ions) remain bonded to the picolinate, aspartate, gluconate, ascorbate or lactate ligands and are selectively absorbed through the intestinal membrane of humans. Thus, the beverage at compositions comprise beverage solutions containing per 354 ml: from about 0.01 meq to about 71 meq of calcium ions supplied by from about 1 mg to about 7600 mg of calcium picolinate and/or calcium aspartate where the 0.01–71 meq of calcium ions are bonded to the picolinate, aspartate, gluconate, ascorbate or lactate donor agent within the beverage solution and are included within the compounds calcium picolinate, calcium aspartate, calcium gluconate, calcium ascorbate and/or calcium lactate.

The beverage composition also broadly comprises calcium phytate and/or a calcium compound selected from the group consisting of calcium acetate, calcium caseinate, calcium glutamate, calcium pyruvate, calcium palmitate and mixtures thereof. More specifically, the beverage compositions comprise a beverage solution containing per 354 ml: from about 0.01 mg to about 1700 mg of calcium phytate, and/or from about 0.01 mg to about 1700 mg of calcium acetate, and/or from about 0.01 mg to about 1700 mg of calcium caseinate and/or from about 0.03 mg to about 3700 mg of a mixture of calcium phytate, calcium acetate and/or calcium caseinate.

Should the calcium compound include calcium glutamate, calcium phytate and/or calcium palmitate, the beverage compositions would comprise a beverage solution containing per 354 mg: from about 0.01 mg to about 1700 mg of calcium glutamate, from about 0.01 mg to about 7000 mg of calcium palmitate and/or from about 0.01 mg to about 9500 mg of a mixture of calcium glutamate, calcium phytate and calcium palmitate.

Alternatively, the beverage compositions of this invention comprise a beverage solution containing per 354 ml: from about 10 mg to about 9400 mg of a calcium compound selected from the group consisting of calcium acetate, calcium caseinate and mixtures thereof. The calcium phytate, calcium acetate, calcium caseinate, calcium glutamate, calcium pyruvate and/or calcium palmitate (or any of the calcium compounds including calcium acetate, calcium aspartate, calcium ascorbate, calcium gluconate, calcium picolinate, calcium lactate) in these quantities provide from about 0.01 meq to about 71 meq of calcium ions (or from about 2.1 mg to about 1400 mg of calcium ions) to the human body per 354 ml of beverage solution. The calcium ions combine with the bidentate ligands (picolinate, aspartate, gluconate and pyruvate) by coordinate bonding and remain bonded to the ligands until after transport through the intestinal barrier by selective absorption. Calcium ions, which are not bonded to bidentate ligands generally, are not absorbed through the amino acid selective loci of the human intestinal membrane.

The beverage composition further broadly comprises the above described calcium compounds and a magnesium compound selected from the group consisting of magnesium picolinate, magnesium aspartate, magnesium gluconate, magnesium ascorbate, magnesium lactate, magnesium phytate, magnesium acetate, magnesium caseinate, magnesium glutamate, magnesium pyruvate, magnesium palmitate and/or mixtures thereof.

More particularly, the beverage composition comprises a beverage solution containing per 354 ml: from about 0.1 mg to about 10,000 mg of magnesium picolinate and/or from about 5 mg to about 9400 mg of a magnesium compound selected from the group consisting of magnesium aspartate, magnesium gluconate, magnesium ascorbate, magnesium lactate, magnesium phytate, magnesium acetate, magnesium caseinate, magnesium glutamate, magnesium pyruvate, magnesium palmitate and mixtures thereof and/or from about 6 mg to about 3900 mg of magnesium aspartate, magnesium gluconate, magnesium acetate, magnesium pyruvate, magnesium palmitate, magnesium ascorbate, and/or magnesium lactate and/or from about 0.1 mg to about 10,000 mg of magnesium phytate and/or magnesium caseinate and/or from about 6 mg to about 4000 mg of magnesium glutamate and/or from about 4 mg to about 9700 mg of a magnesium compound selected from the group consisting of magnesium aspartate, magnesium gluconate, magnesium ascorbate, magnesium lactate, magnesium phytate, magnesium acetate, magnesium caseinate, magnesium glutamate, magnesium pyruvate, magnesium palmitate and mixtures thereof.

The described calcium compounds and magnesium compounds in these indicated quantities provide from about 0.01 meq to about 71 meq of calcium ions and from about 0.01 meq to about 60 meq of magnesium ions to the human body with each 354 ml of beverage solution. The magnesium ions are bivalent cations that combine with the picolinate, aspartate, gluconate, ascorbate or lactate ligands though coordination. The coordinating ligands are attached to the bivalent cations by means of a lone pair of electrons. After ingestion, these bivalent cations (magnesium ions) remain bonded to the ligand and are selectively absorbed through the intestinal membrane of humans.

The magnesium ions released or disassociated from the magnesium compounds help to facilitate the selective absorption of the calcium compounds through the intestinal loci and into the blood stream of humans. In one embodiment of the beverage composition, the beverage solution contains per 354 ml: from about 0.01 meq to about 71 meq of calcium ions and from about 0.01 meq to about 60 meq of magnesium ions supplied by from about 6 mg to about 9700 mg of a magnesium compound selected from the group consisting of magnesium picolinate, magnesium aspartate, magnesium gluconate, magnesium ascorbate, magnesium lactate, magnesium phytate, magnesium acetate, magnesium caseinate, magnesium glutamate, magnesium pyruvate, magnesium palmitate and mixtures thereof.

The embodiment can additionally comprise from about 0.01 meq to about 50 meq of potassium ions supplied by from about 0.01 mg to about 11,000 mg of potassium picolinate, and/or from about 10 mg to about 1200 mg of potassium aspartate, and/or from about 10 mg to about 3500 mg of potassium gluconate, and/or from about 10 mg to about 2500 mg of potassium ascorbate, and/or from about 19 mg to about 2300 mg of potassium lactate, and/or from about 0.01 mg to about 5000 mg of potassium phytate, and/or from about 10 mg to about 2600 mg of potassium acetate, and/or from about 10 mg to about 2700 mg of magnesium glutamate, and/or from about 2 mg to about 4000 mg of potassium pyruvate, and/or from about 0.01 mg to about 3700 mg of potassium palmitate, and/or from about 10 mg to about 3100 mg of a mixture of a potassium compound selected from the group consisting of potassium picolinate, potassium aspartate, potassium gluconate, potassium ascorbate, potassium lactate, potassium phytate, potassium acetate, potassium caseinate, potassium glutamate, potassium pyruvate, potassium palmitate and mixtures thereof.

The potassium ion tends to form weak bonds due to the presence of a single valence electron. However, the potassium ion can be complexed with an amino acid and therefore remain complexed to picolinate, aspartate, gluconate, pyruvate or glutamate until after passage through the intestinal walls of humans. Whenever the beverage composition is comprised of from about 0.01 meq to about 50 meq of potassium ascorbate, potassium lactate, potassium phytate, potassium acetate or potassium caseinate, the potassium compound will dissociate with the potassium ion and be free to complex with an excess of any picolinate, aspartate, gluconate, pyruvate or glutamate present.

The invention also comprises a sweetener agent selected from the group consisting of sucrose, high fructose corn syrup, invert sugars, crystalline fructose, fructose polymers, aspartame, glucose, glucose polymers, sucralose, Saccharine® and mixtures thereof. Preferably, the sweetener agent is selected from the group consisting of sucrose, crystalline fructose, fructose polymers, glucose, glucose polymers, Aspartame®, sucralose and/or mixtures thereof. Most preferably, the sweetener agent for the non-dietetic formulation is crystalline fructose and for the dietetic formulation is sucralose or Aspartame® and/or mixtures thereof.

Crystalline fructose is the preferred sweetener agent for the invention in the non-dietetic form. Fructose is absorbed by humans through a facilitated diffusion process. Its movement across the intestinal membrane is more rapid than would be expected from simple diffusion. Facilitated diffusion involves the intermediary formation of a complex with a specific transport or carrier protein. If crystalline fructose is used as the sweetening agent, from about 0.01 g to about 50 g is used per 354 ml of beverage solution. If fructose polymers are used as a sweetening agent for this invention, from about 0.1 g to about 1000 g is used per 354 ml of beverage solution. Fructose polymers, as is known in the art, impart enhanced nutritional activity due to the way the substance is transported through the intestinal tract and processed by the body.

If sucrose is used as the sweetener, from about 0.01 g to about 100 g is used per 354 ml of beverage solution. If Aspartame® is used as the sweetener, from about 0.05 g to about 30 g is used per 354 ml of beverage solution. If sucralose is used as the sweetener, from about 0.01 g to about 30 g is used per 354 ml of beverage solution. If glucose polymers are used as the sweetener, from about 0.01 g to about 1000 g is used per 354 ml of beverage solution. If glucose is used as the sweetener, from about 0.01 g to about 100 g is used per 354 ml of beverage solution. If Saccharine® is used as the sweetener, from about 0.01 g to about 10 g is used per 354 ml of beverage solution. If crystalline fructose, fructose polymers, glucose, glucose polymers, sucrose, Aspartame®, Saccharine®, sucralose and/or mixtures thereof are used as the sweetener, from about 0.01 g to about 200 g is used per 354 ml of beverage solution.

The beverage solution further can include a flavoring agent such as chocolate fudge, chocolate, vanilla, strawberry, prairie berry, mocha, latte, peach, almond, coconut, raspberry, saskatoon berry, plains berry, apple, orange, butterscotch, coffee, blueberry and/or mixtures thereof. Flavors and/or mixtures thereof chosen from the list above will be added from about 0.01 g to about 50 g per 354 ml of beverage solution.

The beverage composition of all mixtures of this invention can also broadly comprise from about 50 IU (international units) to about 600 IU of vitamin D per 354 ml of beverage solution. The vitamin D is to be added in the above concentration to any mixture of the beverage solution.

Additionally, the beverage composition of all embodiments of the invention can comprise vitamin C (ascorbic acid). The vitamin C can be added from about 0.1 mg to about 1000 mg to any and all embodiments of the invention per 354 ml of beverage solution.

The beverage composition can also comprise folic acid. The folic acid can be added from about 0.01 mg to about 0.40 mg to all embodiments of the invention per 354 ml of beverage solution. The beverage composition can also comprise vitamin A. The vitamin A can be added from about 500 IU to about 5000 IU to any and all embodiments of the invention per 354 ml of beverage solution.

It should be noted that there is no need to supplement the beverage compositions with the B complex vitamins, vitamin K, phosphorous, iron and strontium. Adequate dietary quantities of these vitamins and minerals are present in the skim milk and non-fat dry milk powder elements.

All mixtures of the beverage solution disclosed herein can also comprise the addition of a preservative. The preservative used is preferably natural and bacteriostatic. The preferred preservative is benzoic acid and/or a benzoate compound such as sodium benzoate, potassium lactate, calcium benzoate and/or magnesium benzoate. When used in any and all embodiments of the invention, these compounds comprise from about 0.15 g to about 0.70 g of benzoic acid, sodium benzoate, potassium benzoate, calcium benzoate, magnesium benzoate and/or mixtures thereof per 354 ml of beverage solution.

The beverage composition also comprises the addition of carbonation, i.e., the forceful introduction of carbon dioxide gas, under pressure, against a liquid surface, which causes the absorption of the gas into the liquid. Preferably, from about 0.10 volumes to about 4 volumes of gas is added per 354 ml of beverage solution. The higher the gas pressure and the cooler the liquid, the more carbonation that is absorbed as is well known in the art. Carbonation has the effect of enhancing the flavor, taste, and mouth-feel and lowering the pH of the beverage to render it more desirable.

Another aspect of the invention is the method used to prepare the beverage composition. With any of the embodiments, a predetermined volume of a liquid solvent (e.g., water or purified water) is used. This is the major component and starting material for the beverage solution. In a preferred embodiment, purified water (that can be obtained, for example, by using reverse osmosis on undistilled water as is well known in the art) is used to eliminate undesirable impurities that are commonly present in unpurified municipal water such as bacteria suppressing additives, organic and inorganic chemicals, radionuclides, pesticides, fluoride and the like. Such impurities can interfere with the solubility and function of the desired ingredients as well as impart undesirable taste. In general, from about 10 ml to about 344 ml of purified water should be used for every 354 ml of beverage solution to be produced.

The water should be brought to and maintained at ambient temperature (70°–74° F.) to enhance solubility and prevent clumping of the solid ingredients to be added. After a selected amount of water is obtained, from about 1 g to about 1000 g of non-fat dry milk powder (prepared by heat or freeze-dry methods as is known in the art) or from about 1 g to about 35 g of non-fat milk substitute powder containing sweet dairy whey, dried corn syrup, sodium caseinate and partially hydrogenated soybean oil or mixtures thereof is added to the beverage mixture. In an alternate embodiment, about 350 ml of skim milk can be used in place of the water solvent and one or both of the non-fat dry milk powder and the non-fat substitute powder. It is to be understood that the methods used to prepare the non-fat dry milk or the non-fat substitute powder (substances which are commercially available) are not part of the invention.

In a preferred embodiment, from about 1.0 g to about 1000 g of non-fat dry milk is added to from about 150 ml to about 190 ml of preferably purified water. The mixture is stirred at low shear for at least two minutes. After stirring, from about 1.0 mg to about 7600 mg of a calcium salt selected from the group consisting of calcium picolinate, calcium aspartate and mixtures thereof or from about 1.0 mg to about 9000 mg of a calcium salt selected from the group consisting of calcium gluconate, calcium lactate, calcium ascorbate and mixtures thereof or from about 0.01 mg to about 1700 mg of a calcium salt selected from the group consisting of calcium phytate, calcium acetate, calcium caseinate, calcium glutamate, calcium palmitate and mixtures thereof or from about 10 mg to about 9400 mg of calcium pyruvate or mixtures of any of the identified calcium salts are added to each 354 ml of the beverage mixture. The mixture is stirred for a second time for at least two minutes.

Following the second stirring step, from about 6.0 mg to about 3900 mg of a magnesium salt selected from the group consisting of magnesium aspartate, magnesium gluconate, magnesium ascorbate, magnesium lactate, magnesium acetate or from about 0.1 mg to about 10000 mg of a magnesium salt selected from the group consisting of magnesium phytate, magnesium caseinate, magnesium pyruvate, magnesium palmitate, magnesium piconlinate and mixtures thereof or from about 6.0 mg to about 4000 mg of magnesium glutamate and mixtures of any of the identified magnesium salts are added to each 354 ml of the beverage mixture. The mixture is again stirred for at least two minutes.

Following the addition of the magnesium salt, a potassium salt is added to the mixture. From about 21 mg to about 11000 mg of potassium picolinate, and/or from about 10 mg to about 1200 mg of potassium aspartate, and/or from about 10 mg to about 3500 mg of potassium gluconate, and/or from about 21 mg to about 2500 mg of potassium ascorbate, and/or from about 19 mg to about 2300 mg of potassium lactate, and/or from about 10 mg to about 5000 mg of potassium phytate, and/or from about 10 mg to about 2600 mg of potassium acetate, and/or from about 10 mg to about 2700 mg of potassium glutamate, and/or from about 10 mg to about 4000 mg of potassium pyruvate, and/or from about 10 mg to about 3700 mg of potassium palmitate and/or mixtures thereof are added to each 354 ml of the beverage mixture. The mixture is again stirred for at least two minutes.

Optionally, from about 50 IU to about 600 IU of vitamin D is added to each 354 ml of the beverage mixture which is stirred for an additional two minutes. Also optionally, from about 500 IU to about 2000 IU of vitamin A is added to each 354 ml of the beverage mixture, which is stirred for another two minutes. Also optional is the addition of from about 0.01 IU to about 1.0 IU of folic acid to each 354 ml of the beverage mixture, which is stirred yet again for at least two minutes.

A sugar or sugar substitute is also added to the mixture. From about 1.0 g to about 50 g of crystalline fructose and/or from about 1.0 g to about 100 g of sucrose and/or from about 0.10 g to about 1000 g of fructose polymers and/or from about 0.05 g to about 30 g of Aspartame® and/or from about 0.1 g to about 30 g of sucralose and/or from about 1.0 g to about 100 g of glucose and/or from about 0.1 g to about 10 g of Saccharine® and/or from about 0.1 g to about 1000 g of glucose polymers and/or mixtures thereof are added to each 354 ml of the beverage mixture. The mixture is again stirred for at least two minutes.

To enhance the taste of the mixture, from about 0.1 mg to about 50 mg of a flavoring agent selected from the group consisting of chocolate fudge, chocolate, vanilla, strawberry, prairie berry, mocha, latte, peach, almond, coconut, raspberry, saskatoon berry, plains berry, apple, orange, butterscotch, coffee, blueberry and mixtures thereof is added. The mixture is again stirred for at least two minutes.

Following the addition of all essential and optional ingredients, the mixture is pasteurized in accordance with applicable Federal guidelines for grade A milk processing to ensure safety for consumption. The mixture is preferably maintained within a pH range of from about 4.0 to about 7.0. Carbon dioxide gas is used as the pH adjusting agent. From about 0.1 volumes to about 4.0 volumes per 354 ml of beverage solution is used to maintain the solution within the desired pH range. The higher the $CO_2$ content, the lower the pH.

To facilitate the carbonization of the mixture, the beverage mixture is cooled to a temperature range of from about 32° F. to about 68° F. Pressurized carbon dioxide ($CO_2$) gas is forced through the beverage mixture from about 0.1 volumes to about 4.0 volumes per 354 ml of beverage mixture. Alternatively, the carbonation may be added by reducing the initial purified water used to from about 10 ml to about 150 ml and then adding from about 190 ml to about 350 ml of purified carbonated water with a carbonation volume of from about 0.1 volumes to about 4.0 volumes per 354 ml of beverage or beverage solution.

After the addition of the carbon dioxide gas or, alternatively, the carbonated water, the beverage mixture is mixed in a closed container for at least two minutes. The mixture is then dispensed into coated aluminum or steel beverage cans and/or PET containers and/or glass containers and/or EVOH (ethylene vinyl alcohol) containers and immediately sealed to retain carbonation using closure methods well known in the art. To maintain the taste quality of the beverage, the beverage must be stored at temperatures in the range of from about 34° F. to about 44° F.

In an alternate embodiment, a dry beverage mixture embodiment, the beverage mixture is prepared as described above with the following exceptions: 1) the water (purified or unpurified) is not added; 2) all the solid essential and desired optional ingredients are combined and blended in a ribbon or dry blender; 3) the carbon dioxide gas is not added to the preparation; and 4) the dry mixture is packaged in polyethylene-foil-polyethylene laminate pouches for later use. This allows the pre-beverage mixture of solids to be stored for long periods of time without having to take precautions to prevent carbonation depletion such as maintaining the mixture at a selected temperature range. When the liquid beverage is desired, water and carbonation are added to the mixture using the methods described above to produce a completed beverage mixture that is ready for consumption.

To inhibit the formation of bacterial colonies in the various beverage embodiments, the beverage can be pasteurized prior to the addition of the $CO_2$. HTST pasteurization is the preferred method. Other methods known well in the art can also be used to achieve the same bacteria suppression, e.g., VAT pasteurization. If HTST pasteurization is used, the beverage, pre-carbonation, is subjected to 180° F. heat for about 30 seconds up to about 185° F. heat for about 2 seconds. If VAT pasteurization is used, the beverage, pre-carbonation, is subjected to temperatures up to about 1852° F. for up to about 40 minutes.

In an alternate embodiment, $CO_2$ is bubbled into the beverage pre-pasteurization step, in an amount ranging from about 2,000 to about 10,000 parts per million (ppm) at ambient temperature for up to 5 minutes. By employing this procedure, the total colony count of bacteria normally present in a milk-based medium was decreased six-fold. It was found that the higher the $CO_2$ amount and the longer the product was exposed to $CO_2$, the lower the bacterial count. Optionally, the beverage can then be pasteurized using any of the known pasteurization methods. If pasteurization is used, $CO_2$ has to be reintroduced into the beverage since pasteurization disseminates any $CO_2$ present. First, the beverage's temperature has to be brought down to from about 31° F. to about 34° F. after pasteurization. Preferably, the beverage mixture is transported through chilled stainless steel or glass pipes for a minimum distance of 100 feet with back pressure to assure thorough mixing. $CO_2$ is bubbled into the beverage mixture at a rate of from about 100 to about 175 ppm. The combination of milk protein, low temperature and length of the flow tube used to introduce $CO_2$ into the beverage mixture maximizes the $CO_2$ concentration to preferably from about 1,500 ppm to about 4000 ppm in the finished product. 1000 ppm is about 0.5 volumes. $CO_2$ concentrations are expressed herein in either ppm or volume units. To convert from one unit to the other, 1000 ppm is equivalent to about 0.5 volumes.

Beverages made with the $CO_2$-Pasteurization-$CO_2$ combination exhibited bacterial counts of less than 60 colonies per field. No coliform colonies were found. The effective shelf life of the disclosed milk-based beverages was increased by 10 days to over 75 days with refrigeration. It is fully expected that similar results should be realized even without the pasteurization step, based on the test results taken after the initial $CO_2$ infusion, described above. It is thus possible to prepare milk-based beverages without pasteurization and achieve acceptable bacteria levels. Elimination of the pasteurization step should also reduce production costs as carbonating a beverage is much less expensive than pasteurizing the same beverage, particularly with respect to equipment and energy needs.

Beverages infused with $CO_2$ at ambient temperature, either prior to or without pasteurization, do not experience settling or separation of the beverage components. Shaking is not needed for re-admixture. Stabilizers are not needed to prevent component separation. Natural or artificial gel binders are not needed when vitamins and minerals are added to the beverages.

It is to be understood that the sequence of adding the ingredients as set forth herein is not essential to the production of the beverage mixture with one exception. It is important that the calcium salt(s) be added to the mixture before the magnesium salt(s) to prevent undesired clumping.

Having described the invention, it should be understood that the foregoing description of the invention is intended merely to be illustrative thereof and that other modifications, embodiments and equivalents may be apparent to those who are skilled in the art without departing from its spirit.

Having thus described the invention, what we claim as new and desire to secure by United States Letters Patent is:

1. A beverage composition suitable for human consumption comprising per 354 ml of composition:
   from about 10 ml to about 344 ml of water;
   from about 1 g to about 1000 g non-fat dry milk;
   from about 0.01 meq to about 119 meq of calcium ions supplied from about 1 mg to about 9,000 mg of a calcium salt selected from the group consisting of calcium picolinate, calcium aspartate, calcium gluconate, calcium ascorbate, calcium lactate and mixtures thereof;
   from about 0.01 meq to about 60 meq of magnesium ions supplied from about 0.1 mg to about 10,000 mg of a magnesium salt selected from the group consisting of magnesium picolinate, magnesium aspartate, magnesium gluconate, magnesium ascorbate, magnesium lactate, magnesium phytate, magnesium acetate, magnesium caseinate, magnesium glutamate, magnesium pyruvate, magnesium palmitate and mixtures thereof;
   from about 0.01 meq to about 50 meq of potassium ions supplied from about 0.01 mg to about 11,000 mg of a potassium salt selected from the group consisting of potassium picolinate, potassium aspartate, potassium gluconate, potassium ascorbate, potassium lactate, potassium phytate, potassium acetate, potassium glutamate, potassium pyruvate, potassium palmitate, potassium caseinate and mixtures thereof;
   from about 0.01 g to about 1000 g of a sweetener; and
   from about 0.1 volumes to about 4 volumes of carbon dioxide gas.

2. The beverage composition of claim 1 further comprising from about 0.01 g to about 50 g of a flavoring agent.

3. The beverage composition of claim 2 wherein the flavoring agent is selected from the group consisting of chocolate fudge, chocolate, vanilla, strawberry, prairie berry, mocha, latte, peach, almond, coconut, raspberry, saskatoon berry, plains berry, apple, orange, butterscotch, coffee, blueberry and mixtures thereof.

4. The beverage composition of claim 1 further comprising from about 50 IU to about 600 IU of vitamin D.

5. The beverage composition of claim 1 further comprising from about 0.1 mg to about 1000 mg of vitamin C.

6. The beverage composition of claim 1 further comprising from about 500 IU to about 5000 IU of vitamin A.

7. The beverage composition of claim 1 further comprising from about 0.01 mg to about 0.40 mg of folic acid.

8. The beverage composition of claim 1 further comprising from about 50 IU to about 600 IU of vitamin D; from about 0.1 mg to about 1000 mg of vitamin C; from about 500 IU to about 5000 IU of vitamin A and from about 0.01 mg to about 0.4 mg of folic acid.

9. The beverage composition of claim 1 further comprising from about 0.15 g to about 0.70 g of a preservative.

10. The beverage composition of claim 9 wherein the preservative is benzoic acid or a benzoate compound selected from the group consisting of sodium benzoate, potassium benzoate, calcium benzoate, magnesium benzoate and mixtures thereof.

11. The beverage composition of claim 1 wherein the composition has a pH of from about 4.0 to about 7.0.

12. The beverage composition of claim 1 further comprising lactase in an amount sufficient to essentially eliminate the activity of milk lactose.

13. The beverage composition of claim 12 further comprising crystalline fruit fructose.

14. A method of preparing a beverage composition suitable for human consumption comprising the steps of:

provid ing from about 10 ml to about 344 ml of a liquid solvent;

heating the liquid solvent to a temperature of from about 70° F. to about 74° F.;

adding non-fat dry milk to the liquid solvent to form a first mixture;

stirring the first mixture for at least two minutes;

supplying calcium ions to the first mixture by adding a calcium salt selected from the group consisting of calcium picolinate, calcium aspartate, calcium gluconate, calcium ascorbate, calcium lactate and mixtures thereof to the mixture to form a second mixture;

stirring the second mixture for at least two minutes;

supplying magnesium ions to the second mixture after supplying calcium ions by adding a magnesium salt selected from the group consisting of magnesium picolinate, magnesium aspartate, magnesium gluconate, magnesium ascorbate, magnesium lactate, magnesium phytate, magnesium acetate, magnesium caseinate, magnesium glutamate, magnesium pyruvate, magnesium palmitate and mixtures thereof;

stirring the third mixture for at least two minutes;

supplying potassium ions to the third mixture by adding a magnesium salt selected from the group consisting of potassium picolinate, potassium aspartate, potassium gluconate, potassium ascorbate, potassium lactate, potassium phytate, potassium acetate, potassium glutamate, potassium pyruvate, potassium palmitate, potassium caseinate and mixtures thereof to the mixture to form a fourth mixture;

stirring the fourth mixture for at least two minutes;

adding a sweetener to the fourth mixture to form a fifth mixture;

stirring the fifth mixture for at least two minutes;

cooling the fifth mixture to ambient temperature;

bubbling $CO_2$ into the fifth mixture;

cooling the fifth mixture to from about 32° F. to about 68° F. to form a cooled mixture;

subjecting the cooled mixture to pressurized carbon dioxide with sufficient pressure and for a sufficient time to provide from about 0.1 volumes to about 4.0 volumes of carbon dioxide dissolved in the cooled mixture to form a carbonated mixture.

15. The method of claim 14 comprising the further step of pasteurizing the fifth mixture before cooling the fifth mixture to ambient temperature.

16. The method of claim 14 comprising the further steps of dispensing the carbonated mixture into a container selected from the group consisting of coated aluminum cans, steel cans, PET containers, glass containers, EVOH containers and mixtures thereof and sealing the container to retain carbonation.

17. A method of preparing a dry mixture for reconstitution with a liquid solvent into a beverage suitable for human consumption comprising the steps of:

providing from about 1 gm to about 1000 gm of a non-fat dry milk;

adding a calcium salt selected from the group consisting of calcium picolinate, calcium aspartate, calcium gluconate, calcium ascorbate, calcium lactate and mixtures thereof to the mixture to form a mixture;

adding a magnesium salt selected from the group consisting of magnesium picolinate, magnesium aspartate, magnesium gluconate, magnesium ascorbate, magnesium lactate, magnesium phytate, magnesium acetate, magnesium caseinate, magnesium glutamate, magnesium pyruvate, magnesium palmitate and mixtures thereof to the mixture;

adding a potassium salt selected from the group consisting of potassium picolinate, potassium aspartate, potassium gluconate, potassium ascorbate, potassium lactate, potassium phytate, potassium acetate, potassium glutamate, potassium pyruvate, potassium palmitate, potassium caseinate and mixtures thereof to the mixture;

adding a sweetener to the mixture;

blending the mixture in a blender to form a blended mixture; and packaging the blended mixture in pouches.

18. The method of claim 17 comprising the additional step of reconstituting the blended mixture with a sufficient amount of a liquid solvent to provide a 354 ml uncarbonated beverage.

19. The method of claim 17 comprising the additional step of bubbling $CO_2$ into the uncarbonated beverage.

20. The method of claim 19 comprising the additional step of cooling the beverage to from about 32° F. to about 68° F.

21. The method of claim 20 comprising the additional step of subjecting the beverage to pressurized carbon dioxide with sufficient pressure and for a sufficient time to provide from about 0.1 volumes to about 4 volumes of carbon dioxide dissolved in the cooled mixture to form a carbonated mixture.

22. The method of claim 21 comprising the further step of pasteurizing the uncarbonated beverage before the cooling step.

* * * * *